6 Sheets--Sheet 4.
W. A. & G. RICE.
Map Exhibiters and Cabinets.
No. 143,717. Patented Oct. 14, 1873.
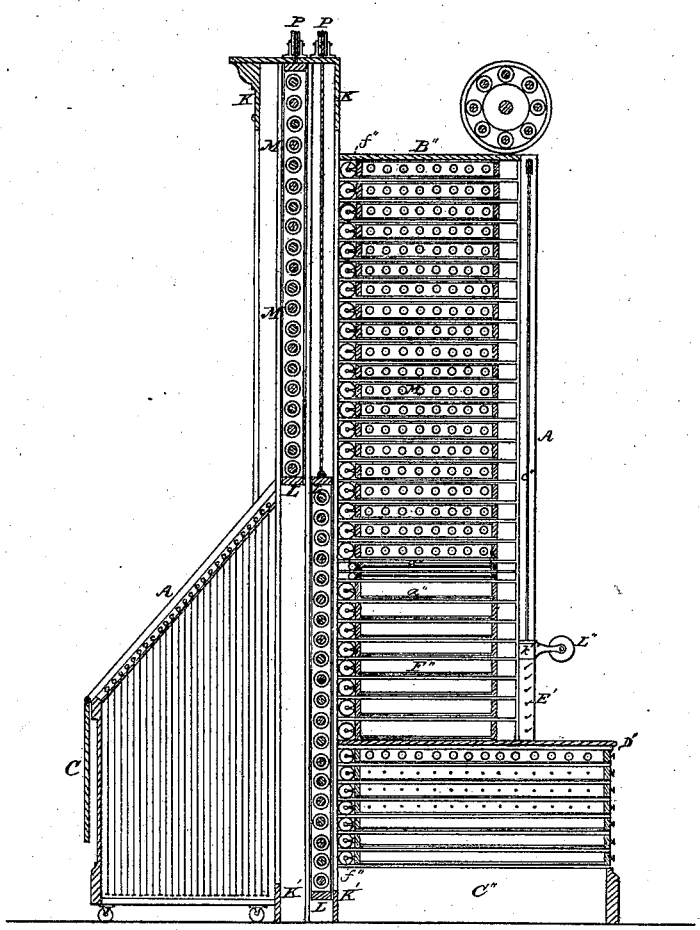
Fig. 4.
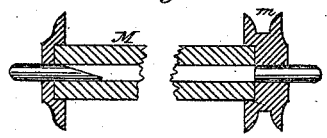
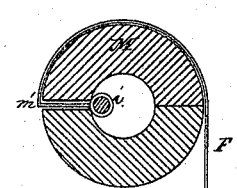
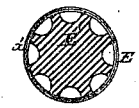
Fig. 5.  Fig. 6ª.  Fig. 7.  Fig. 6ᵇ.
Witnesses:
T. C. Brecht,
John R. Young
Inventors:
Wm. A. and Geo. Rice, by
Prindle and Co. their Attys

W. A. & G. RICE.
Map Exhibiters and Cabinets.
No. 143,717. Patented Oct. 14, 1873.
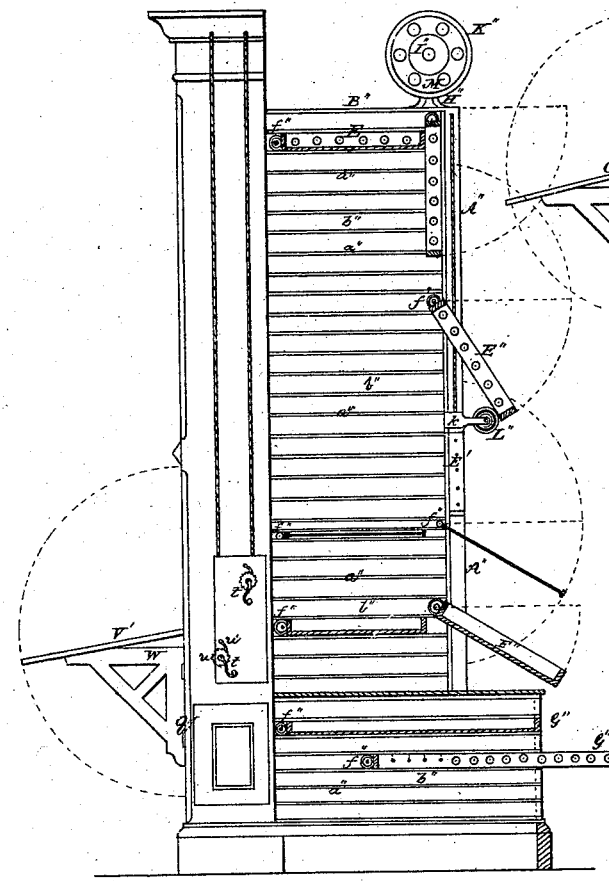
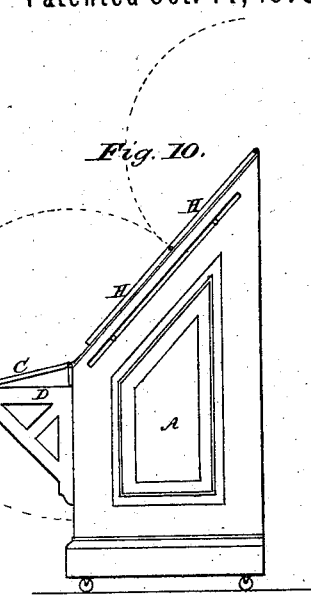
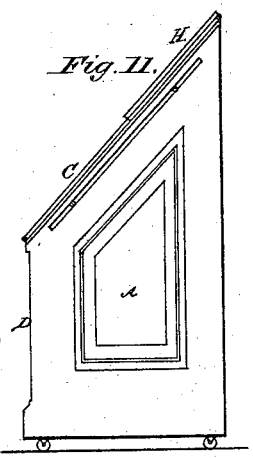
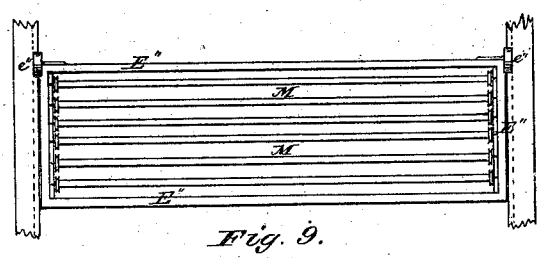
Witnesses:
T. C. Brecht
John R. Young
Inventors:
Wm A. and Geo. Rice, by
Prindle and Co., their Attys 6 Sheets--Sheet 6.
W. A. & G. RICE.
Map Exhibiters and Cabinets.
No. 143,717. Patented Oct. 14, 1873.
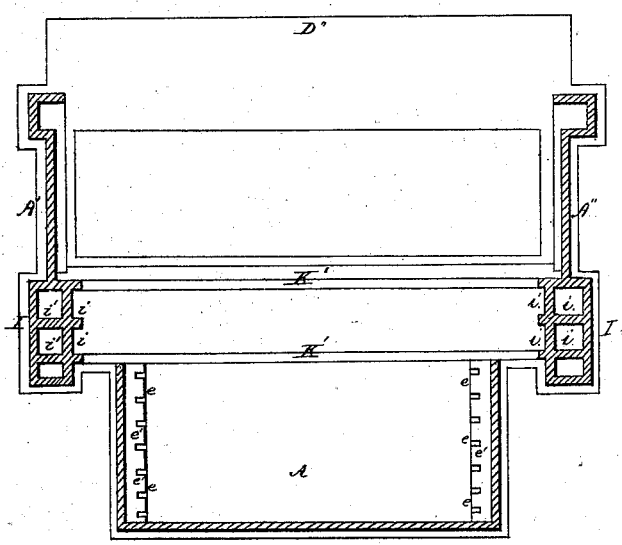
Fig. 12.
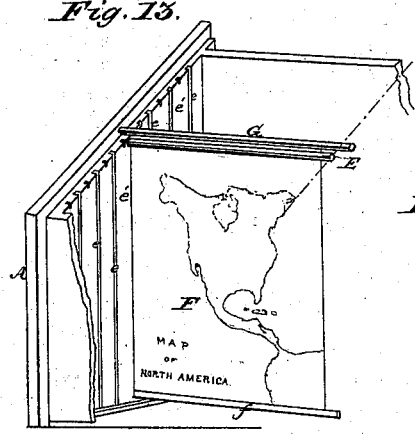
Fig. 13.
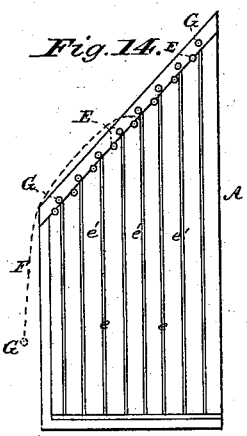
Fig. 14.
Fig. 15.
Witnesses:
T. C. Brecht.
John R. Young
Inventors:
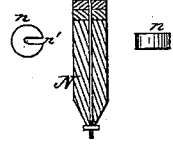
Wm. A. and Geo. Rice, by
Prindle and Co., their Att'ys
AM. PHOTO-LITHOGRAPHIC Co. N.Y. (OSBORNE'S PROCESS)

UNITED STATES PATENT OFFICE.

WILLIAM A. RICE AND GEORGE RICE, OF FRAMINGHAM, MASSACHUSETTS.

IMPROVEMENT IN MAP EXHIBITORS AND CABINETS.

Specification forming part of Letters Patent No. 143,717, dated October 14, 1873; application filed March 24, 1871.

*To all whom it may concern:*

Be it known that we, WILLIAM A. RICE and GEORGE RICE, of Framingham, in the county of Middlesex and State of Massachusetts, have invented certain new and useful Improvements in Map Exhibitors and Cabinets; and do hereby declare that the following is a full, clear, and exact description thereof, reference being had to the accompanying drawings making a part of this specification, in which—

Figure 1:
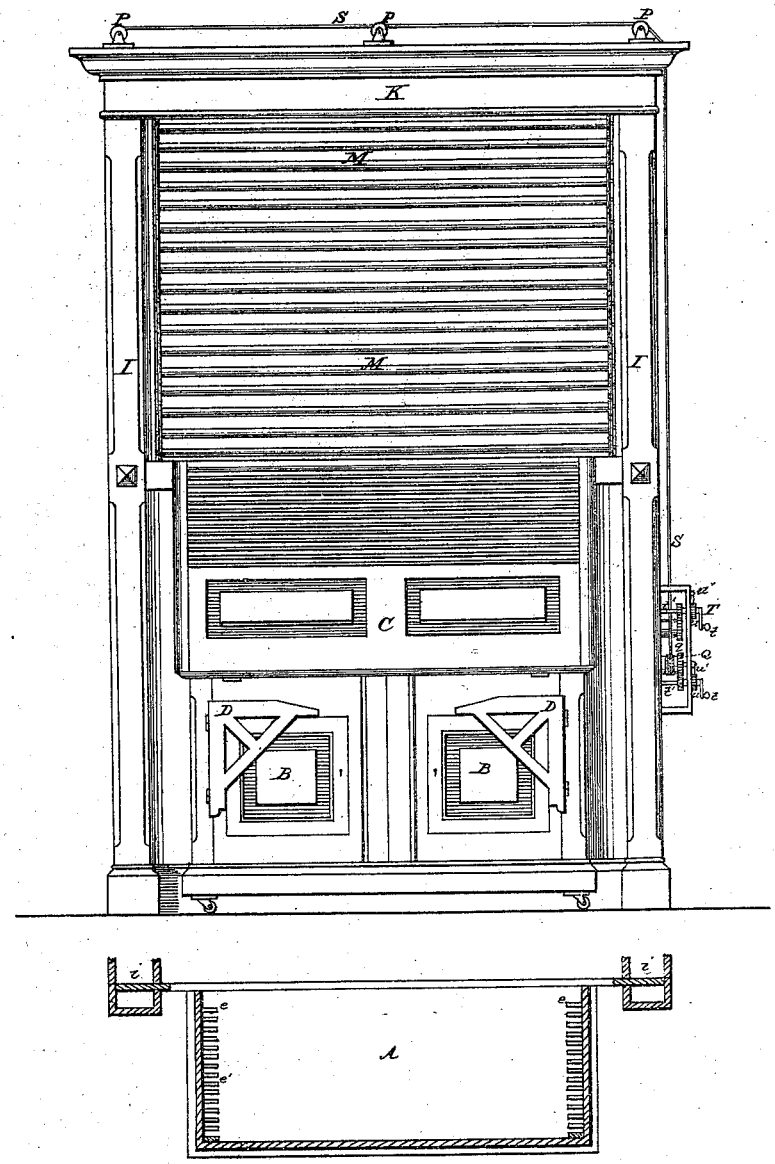
Figure 2:
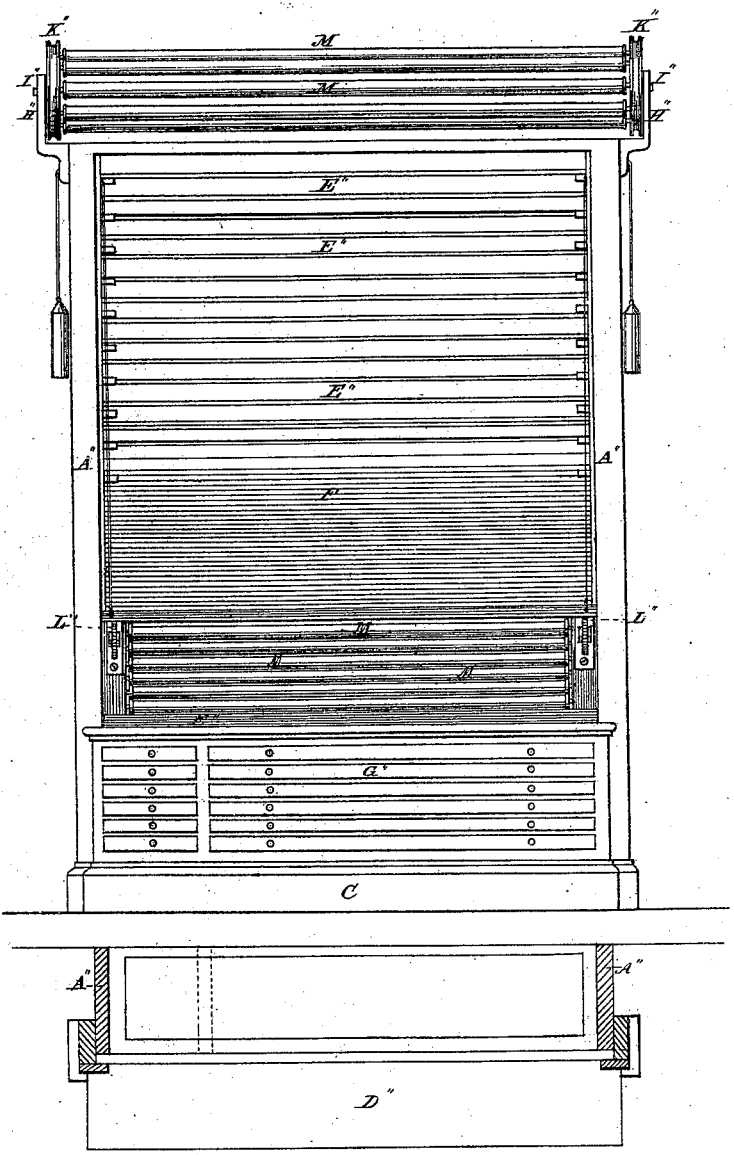
Figure 3:
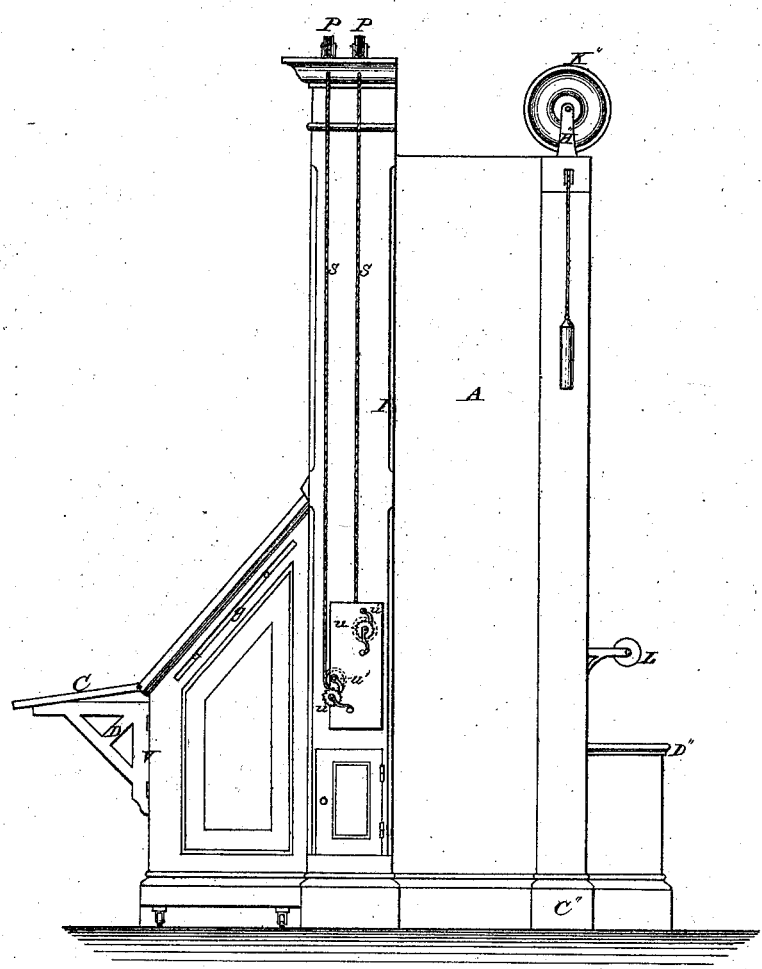

Figure 1 is a front elevation of our improved device. Fig. 2 is a rear elevation of the same. Fig. 3 is a side elevation, showing the means employed for adjusting, vertically, the roller-sash. Fig. 4 is a vertical central section on the lines $x\ x$ of Figs. 1 and 2. Fig. 5 is a vertical longitudinal section of one of the map-rollers. Fig. 6 is a cross-section of the same. Fig. 7 is a like view of another form of roller. Fig. 8 is a side elevation of the map-holder without the cabinet, and with a portion of the rear part removed, in order to show the arrangement of the pivoted roller-frames, book-holders, and black-board. Fig. 9 is a rear elevation of the upper portion of the same, showing a roller-sash drawn outward, and suspended from or by its pivots. Fig. 10 is a side elevation of the cabinet with its lid opened outward, and its hinged adjustable cover in place. Fig. 11 is a like view of said cabinet with the lid and adjustable cover closed. Fig. 12 is a horizontal section of the map-holder on the lines $y\ y$ of Figs. 1 and 2. Fig. 13 shows the manner of suspending maps in the cabinet. Fig. 14 is a vertical section of said cabinet, further illustrating the manner of suspending therein maps; and Fig. 15 is a vertical central section of the weights and their supporting-rods, used for counterbalancing the roller-sash.

Letters of like name and kind refer to like parts in each of the figures.

Our invention is designed to afford a means whereby any required number of maps may be conveniently stored when not in use, and at other times readily suspended or placed in a convenient and accessible position for reference; to which end it consists, principally, in the employment of sash provided with pivoted map-rollers, and so arranged within a case as that, when drawn horizontally outward, and their outer ends dropped downward, they shall remain suspended by or upon suitable pivots or rollers attached to their rear or inner ends, substantially as is hereinafter set forth. It consists, further, in the employment of a pivoted cylinder, having its periphery formed of a series of pivoted rollers for containing maps, substantially as and for the purpose hereinafter described. It consists, further, in the employment of hollow metal map-rollers, strengthened and made more rigid by means of a filling of wood having three or more radial bearings, substantially as is hereinafter specified. It consists, further, in the general construction and arrangement of the various parts of the cabinet portion of the map-holder, substantially as is hereinafter shown and described. It consists, further, in the construction and arrangement of the portion containing the vertical roller-sash, substantially as is hereinafter shown. It consists, finally, in the general construction and relative arrangement of the various parts of the map holder and exhibitor, whereby they are adapted to each other, and together produce a device capable of containing and exhibiting any required number of maps in a most satisfactory manner, substantially as is hereinafter set forth.

As our invention is formed of three devices that may be used separately, if desired, they will each be described in their order, and then as combined.

As seen in the annexed drawings, the cabinet A consists of a case having a horizontally-rectangular form, its sides and rear being tightly inclosed, while its front side is provided with folding-doors B, through which access may be had to its interior. The upper side of the cabinet slopes downward from the rear to the front at an angle of about forty-five degrees, and is partially covered by means of a lid, C, so hinged at its front edge to the front side of said cabinet as to permit it to swing over, so as to hang in a vertical position, as seen in Fig. 4, or when desired for use as a desk, it may be held in the required position by means of two brackets, D, hinged at their rear sides to the front of the cabinet, so as to be capable of folding inward against the same when not in use. Upon the inner face of each of the sides of the cabinet, immediately below its sloping upper end, is a ledge, *a*, within which is pivoted one end each of a series of rollers, E, which are placed at equidistant points upon said ledges, and extend horizontally across said cabinet in a line with its front and rear sides. By means of a strip, *e*, secured in a vertical position upon the sides of the cabinet immediately beneath each roller E, a groove, *e'*, is formed between each pair of rollers, which receives the end of the slat or stick *f* upon the lower edge of each map, and serves to hold the same in position with relation to other maps, and prevent interference between the same, the length of said slat being sufficient to cause each of its ends to enter a slot. The maps F are each suspended from a suitable round slat or bar, G, (shown in Fig. 6,) which have a length sufficient to enable them to rest within or upon the ledge *a*, the weight of said maps operating over the rollers E being sufficient to hold said bars in position upon the incline. The maps are each suspended from or by their lower edge, and are faced to the rear, so that when drawn outward over the roller in front, and permited to rest upon the lid C, they are in the right position for reference. If desired, two maps may be placed back to back upon the same canvas, and reversed whenever that in front is needed for use, by which means the capacity of the cabinet would be doubled. In order to prevent the lower slats or bars *f* from passing the rollers E when the maps are drawn up for reference, a bar, *g*, is loosely fitted into a corresponding slot provided in and through the side of the cabinet, in a line with and immediately beneath said rollers, and projects sufficiently inward to engage with the ends of said slats. When desired to remove a map, the locking-bar *g* is drawn outward to a sufficient distance to allow the slats to pass.

It being necessary at times to use the sloping portion of the cabinet as a desk, an adjustable cover, H, is fitted to the same over the rollers, and being hinged at its center may be folded together so as to fit the space above the lid C when the cabinet is not in use. The upper edge of said adjustable cover is secured in place by means of one or more hooks engaging with the upper edge of the rear side of the cabinet, or with a roller extending across immediately above the same.

Next in order comes the portion of the map-holder containing the vertically-adjustable roller-sash, which is constructed as follows: Two upright posts, I, containing within their inner faces two grooves, *i*, are connected together at their upper ends by a suitable hollow tie-bar, K, which forms also a cornice, and at their lower ends by one or more tie-bars, K'. Corresponding in position with the grooves *i* are two longitudinal openings, *i'*, formed within the posts I, between said grooves and the outside of said posts, the object of which is to receive and contain the necessary weights for counterbalancing the roller-sash, which, as seen in Figs. 1, 2, and 4, are constructed of four rails, L, joined together at their ends so as to form a right-angled frame, corresponding interiorly in width to the breadth of the largest map to be used, and in height to the number of map-rollers that are to be contained therein. A series of rollers, M, are so pivoted upon suitable bearings within each frame as to be easily adjusted to or removed therefrom, and are each provided at one or both ends with a grooved pulley, *m*, and a tape or cord, or other equivalent means, whereby they may be rotated, and the map wound thereon. Each sash of rollers is counterbalanced by means of two weights, N, which are each suspended within an opening, *i'*, upon a rod, *o*, attached to a cord, O, which, passing upward over a suitable pulley, P, upon the top of the tie-bar K, is in turn attached to one of the outer upper corners of said sash. It is intended that the weights N shall just counterbalance the sash with its rollers; and, in order to provide for the additional weight of maps, small sectional weights *n*, having in each a radial slot, *n'*, to enable them to pass over or around the rod *o*, are provided, and are placed upon or removed from the top of said weight N, as occasion may require.

For use without the cabinet, the vertical sash may be readily adjusted to the desired height by the hand; but as when said cabinet is employed it would be difficult to reach them, it becomes necessary to provide the following means for effecting their adjustment:

A short barrel, Q, is pivoted horizontally within a suitable metal frame, R, secured upon one side of a post, I, at a convenient height from the base, and receives one end of a cord, S, which from thence passes upward over suitable pulleys, and is either attached to the center of the sash or is divided and connected with its outer upper corners. A second shaft, T, is pivoted within the frame R, and is provided upon its outer end with a suitable crank, *t*, and upon its body, within said frame, with a pinion, *t'*, which meshes with and imparts motion to a gear-wheel, *q*, attached to one end of the barrel Q. As thus constructed, by turning the crank the barrel will be caused to revolve, so as to wind thereon or unwind therefrom the cord S, and thereby elevate or lower the sash.

In order that the devices may work smoothly, the sash should not be entirely counterbalanced, but should exert a sufficient strain upon the cords S to all times keep them taut, and cause said sash to drop downward readily upon slackening the same. A ratchet-wheel, *u*, secured upon the shaft T just outside of the frame R, and a pawl, *u'*, pivoted upon the face of said frame so as to engage with said ratchet-wheel, enable the elevating devices to be locked in position when desired. As the maps, when on exhibition, are suspended from above the center, vertically, of the upright frame, the lower portion is only used for the reception of such portion of each sash as is below the map being examined, and consequently the face of said frame should be inclosed, in order to protect its contents from dust and injury.

To accomplish this object a board, V, corresponding in length to the space between the uprights I, and in width to one-half the vertical space to be inclosed, is fitted against or between said uprights, and so secured in position as to be readily removed, when necessary, to have access to the interior of the holder. A second board, V', corresponding in size and shape with the board V, is hinged to the upper edge of the latter, so as that when raised upward and occupying a vertical position it shall form a continuation of the same, and inclose the front of said holder to its vertical center, while at other times it may hang downward against the face of said board V. A bracket, W, hinged upon the face of the board V at its center, horizontally, so as to permit it to be swung outward beneath and sustain the board V', converts the same into a convenient desk for use in consulting the maps.

In using this portion of the holder and exhibitor the rollers are each supplied with a map, which, when not in use, is rolled tightly around the same, but when needed for reference said map is unrolled, and its sash adjusted vertically, so as to bring said map into the best possible position for use. When it is desired to economise space two maps may be placed back to back upon the same canvas, and the rollers reversed, as occasion renders it necessary to consult them.

The remaining portion of the holder and exhibitor presents some entirely novel features in connection with the vertically-adjustable sash hereinbefore described, and furnishes a secure and convenient means for storing of large numbers of maps when not required for immediate reference.

As seen in the drawings, a case is formed of two vertical side pieces, A'', secured together at their upper ends by means of a horizontal cross-piece, B'', while the lower ends are connected together by means of a bottom piece, C'', which, having a somewhat greater breadth than said side pieces, extends outward beyond their front edge, and in connection with a corresponding piece, D'', placed parallel with and at a short distance above the same, forms the base. A series of cleats, $a''$, secured horizontally and at equidistant points upon the sides of the case and its base, form thereon a series of grooves, $b''$, for the reception of roller-sash, while a vertical groove, $c''$, corresponding in size with those described, is formed within the inner face of the side piece A'' at or near its front edge.

The sash E'', used in this case, are similar in construction and in breadth to those hereinbefore described, but conform in depth to the depth of the side pieces A'', inside of the vertical groove $c''$, so that when in position within said case they shall not interfere with the movement of sash within said groove.

The rollers employed in all of the sash are uniform in size, so as to be interchangeable, and permit the maps to be used in any portion of the holder and exhibitor, as occasion may require.

The vertically-sliding sash used in the grooves $c''$ is designed to contain but a few rollers, in order that it may not interfere with or prevent ready access to the interior of the case, and, being counterbalanced in a similar manner to those before described, can be adjusted to any desired height, so as to exhibit the maps contained therein to the best advantage.

As many bound volumes of maps are in use which require not only to be securely stored, but also to be conveniently arranged for reference, the following means are employed: A tray, F'', corresponding in exterior dimensions with the sash E'', and having a sufficient depth to enable it to contain the desired bound volumes of maps, is fitted loosely into one of the lower grooves $b''$, and slides freely therein. Projecting laterally and horizontally outward from each rear corner of said tray is a pivot, $f''$, which may fit into corresponding grooves provided within said grooves $b''$; or, if desired, the latter may be deepened sufficiently to contain said pivots, and the same caused to fill said grooves vertically; but in either case the front ends of the deepened grooves must be closed so as to arrest said pivots, and prevent the tray from being drawn entirely out from the case.

As thus arranged, if the tray is drawn outward as far as is possible, and then allowed to drop downward, it will assume the position shown in Fig. 8, its rear end being suspended from and by the pivots, while its lower side rests against the forward end of the cleats immediately beneath, so as to cause said tray to hang at just the desired angle to enable the books to be conveniently consulted.

If desired, a blackboard may be substituted for one of the sash and secured in position within the case in the same manner as the tray just described; and, also, it may be found convenient to attach one or more of said sash in the same manner as shown in Fig. 8, so as to permit ready access to its maps without rendering necessary its removal from the case. The base of the case is employed for storing such rollers as are not in use, said rollers being contained within suitable drawers G'', corresponding in length to the sash E'', and fitting into the grooves $b''$ formed within the side of said base. Journaled within suitable bearings H'', secured to and projecting upward from the upper side of the cross-piece B'', is a shaft, I'', having upon its ends, inside of said journals, two pulleys or circular disks, K'', between and upon which are pivoted a number of map-rollers, said rollers being arranged at equidistant points upon said disks.

Although it is intended that the rollers employed within this drum shall be operated by means of a spring, which, being coiled up when the map is unrolled, shall return said map to position when the latter is released, the usual form may be used with equal advantage.

The rollers upon the drum are intended for use with maps of unusual length; and in order to hold the same out from the face of the case, two rollers, L'', are pivoted within suitable standards k'' that are secured to, and project outward from, the face of the vertically-sliding sash. These rollers may also be used for sustaining the outer edge of the pivoted sash, so as to hold the latter at any desired angle.

There are two forms of rollers employed in our holder and exhibitor, the first of which, E, is placed upon the sloping top of the cabinet between the suspended maps, and its only use is to decrease friction and prevent wear when said maps are drawn upward and outward. As these rollers can occupy but little radial space, it is necessary that they should possess more than ordinary rigidity, to accomplish which result they are constructed from metal tubing $x'$, having within its interior a ribbed or fluted stick of wood, E', which, bearing upon said tube at three or more points, materially increases its strength without interfering with or changing its action as a tube. The second form of roller employed, M, is constructed of wood made hollow and provided with a narrow longitudinal slot, $m'$, that extends radially outward from the interior space. One of the pulleys or disks $m$ upon the end of the roller is made adjustable, and, being removed, permits of the insertion within said roller of the map F, which is seen in Fig. 6; has secured within its edge a wire, $z'$, somewhat larger in diameter than the slot $m'$, so that when the edge of said map is passed into the interior of said roller, said wire shall prevent the withdrawal therefrom of the same.

The bars G, from which the cabinet-maps are suspended, are constructed in the same manner as the rollers M, just described, except that their ends are inclosed by means of simple ferrules instead of the disks or pulleys used in case of the latter, so that, to attach a map to one of said bars, the same process is required as for said rollers.

The map-holder and exhibitor described, it will be readily seen, furnishes a means whereby a large number of maps may be safely stored within a small compass, and yet be so accessible as to render it but a moment's work to place any one in the most convenient and suitable position for exhibition.

Having thus fully set forth the nature and merits of our invention, what we claim as new is—

1. The sash E'', provided with the map-rollers M and pivots $e''$, and made horizontally and radially adjustable within a suitable frame, substantially as and for the purpose shown.

2. The drums I'' and K'', provided with the map-rollers M, substantially as shown, and for the purpose described.

3. The rollers E, consisting of the hollow-metal cylinder or tube $x'$, filled with a ribbed, grooved, or corrugated wooden bar, E', substantially as and for the purpose shown.

4. In combination with the hollow rollers M or bar G, provided with radial longitudinal slots, a map, or its equivalent, having secured to or within its edge a wire or rod, $z'$, substantially as shown, and for the purpose described.

5. The cabinet A, provided with doors B, hinged sloping lid C, brackets D, and arranged to receive map-rollers E, when the several parts are constructed and arranged as set forth.

6. The vertical map-holder I, K, and K', constructed as described, and provided with the vertically-adjustable sash L and M, substantially as shown, and for the purpose set forth.

7. The construction and relative arrangement of the various parts of the map-holder as a whole, substantially as and for the purposes set forth.

In testimony that we claim the foregoing we have hereunto set our hands this 24th day of March, 1871.

WILLIAM A. RICE.
GEORGE RICE.

Witnesses:
GEO. W. BRIDGMAN,
W. H. STEBBINS,
GEO. S. PRINDLE,
JOHN R. YOUNG.